United States Patent

Hagle et al.

[11] Patent Number: 5,236,151
[45] Date of Patent: Aug. 17, 1993

[54] THERMAL BARRIER STRUCTURE

[75] Inventors: Michael P. Hagle, Mason; Reed R. Oliver, Cincinnati, both of Ohio

[73] Assignee: General Electric Company, Cincinnati, Ohio

[21] Appl. No.: 812,665

[22] Filed: Dec. 23, 1991

[51] Int. Cl.⁵ .............................................. B64C 1/38
[52] U.S. Cl. ........................... 244/117 A; 244/158 A; 244/117 R
[58] Field of Search .......... 244/117 R, 117 A, 158 A, 244/123; 165/135

[56] References Cited

U.S. PATENT DOCUMENTS

| | | | |
|---|---|---|---|
| 3,082,611 | 3/1963 | Alvis et al. | 244/117 A |
| 3,267,857 | 8/1966 | Lindberg, Jr. | 244/158 A |
| 3,321,159 | 5/1967 | Jackson | 244/158 A |
| 3,961,098 | 6/1976 | Bessen | 427/34 |
| 3,970,067 | 7/1976 | Copeland et al. | 244/158 A |
| 3,998,603 | 12/1976 | Rairden, III | 29/197 |
| 4,151,800 | 5/1979 | Dotts et al. | 244/158 A |
| 4,344,591 | 8/1982 | Jackson | 244/158 A |
| 4,671,348 | 6/1987 | Bauer | 244/158 A |
| 4,877,689 | 10/1989 | Onstott | 244/158 A |
| 4,925,134 | 5/1990 | Keller et al. | 244/158 A |
| 5,043,138 | 8/1991 | Darolia et al. | 420/443 |
| 5,154,373 | 10/1992 | Scott | 244/117 A |

Primary Examiner—Joseph F. Peters, Jr.
Assistant Examiner—Anne E. Bidwell
Attorney, Agent, or Firm—Jerome C. Squillaro; Carmen Santa Maria

[57] ABSTRACT

An insulative panel is attachable to a structure to thermally protect the structure. The insulative panel includes a piece of a compliant, porous material. A support base is bonded to a first side of the piece of porous material, the support base including means for attaching the support base to the structure that is to be protected. A skin made of a thermally resistant material is bonded to a second side of the piece of porous material. Preferably, the porous material is a piece of porous ceramic foam having an apparent density of less than about 25 percent, the support base is a piece of nonporous ceramic material, and the skin is a ceramic thermal barrier coating that is plasma sprayed onto the porous material.

4 Claims, 2 Drawing Sheets

THERMAL BARRIER STRUCTURE

BACKGROUND OF THE INVENTION

This invention relates to the protection of structures from excessive heating, and, more particularly, to an attachable insulative panel and its applications.

The structure of manned aircraft and helicopters, unmanned missiles, and spacecraft (collectively termed "aircraft" herein) may be heated to high temperatures during flight. The heating is typically a result of one of two causes, aerodynamic heating caused by the friction of air against the structure during flight through the atmosphere, and propulsive heating caused by the hot gases produced within a gas turbine or rocket engine. Either type of heating reduces the strength of the structure, and may lead to long-term degradation of the structure. Additionally, externally visible structure that is hot is detectable on infrared detectors.

There have been many techniques applied to reduce the effects of heat on a structure. The present invention relates to one such approach, the placement of insulative barriers between the heat source and the structure to be protected. Such barriers generally function in the same manner as conventional insulation, creating a thermal gradient between the high external temperature and the underlying structure. As a result of the thermal gradient, the underlying structure remains cooler than it would be if exposed directly to the external heating, and therefore suffers less degradation than would otherwise be the case.

There are several types of thermal barrier approaches. One is a thermal barrier coating (or "TBC") system. A thermal barrier coating is a ceramic material that is deposited as an overlayer on a structural substrate to be protected. In most instances, a bond coat layer is deposited on the substrate first, to improve the adhesion of the thermal barrier coating, which is then applied over the bond coat.

Although thermal barrier coatings are operable and work well in many applications, they have shortcomings when used in other applications. Even with the bond coat, there is a tendency for the ceramic thermal barrier coating to separate from the structure during repeated thermal cycling. Another problem is integration of the thermal barrier coating system with particular substrate applications, which may be difficult due to the configuration of the substrate or other reasons.

Thus, there is a need for an improved thermal insulative system. The present invention fulfills this need, and further provides related advantages.

SUMMARY OF THE INVENTION

The present invention provides a thermal insulative system that is more highly resistant to failure during thermal cycling than prior approaches. Moreover, the approach of the invention can be used in structural situations that can be handled only with great difficulty by conventional thermal insulative systems. The thermal insulative system can be fabricated separately from the underlying structure, and then attached to that structure.

In accordance with the invention, an insulative panel that is attachable to a structure to protect the structure comprises a piece of a compliant, porous material. A support base is bonded to a first side of the piece of porous material, the support base including means for attaching the support base to a structure. A skin made of a thermally resistant material is bonded to a second side of the piece of porous material.

In a particularly preferred embodiment, the piece of porous material is a piece of a compliant, porous ceramic foam such as an open-cell silicon carbide foam having an apparent density of less than about 25 percent. ("Apparent density", as used herein, is a term of art defined as the weight of a given volume of material divided by the weight of a fully dense material of the same volume. The apparent density of a foam is less than 100 percent because of the porosity in the foam.) The support base is made of a nonporous ceramic material bonded to a first side of the piece of ceramic foam, such as fully dense silicon carbide in the case of the preferred silicon carbide foam porous ceramic. The support base includes means for attaching the support base to an underlying structure, such as a connector that can be pinned to the underlying structure. The skin is a nonporous ceramic material such as a yttria-zirconia ceramic that is plasma sprayed onto the face of the porous ceramic on the opposite side from the support base.

With the provision of a suitable ducting arrangement for providing an air flow, the porous, open-celled compliant material permits cooling air to be passed through the thermal barrier structure, very close to the underside of the skin that is exposed to the high external temperature. The surface of the ceramic skin material therefore remains cooler than it would otherwise be.

This embodiment of the invention can be used in any application where the surface of the structure is externally heated, but would find one of its most important applications in non-rotating hot structure within the interior of a gas turbine engine. Such structure includes ducting and gas turbine vanes.

The thermal barrier panel of the invention has the additional important advantage that it reduces the external infrared signature of the structure to which it is attached. The subsurface air flow reduces the skin surface temperature and thus the infrared signature.

Thus, further in accordance with the invention, an aircraft structure having a reduced infrared signature comprises an externally exposed piece of the structure of an aircraft, and an active insulating panel that is attachable to a structure to reduce the surface temperature of the structure. The insulating panel comprises a piece of a compliant, porous material, a support base bonded to a first side of the piece of porous material, the support base including means for attaching the support base to the structure, and a skin made of a thermally resistant material bonded to a second side of the piece of porous material. As used herein, the aircraft structure can be any part of the aircraft. The approach of this embodiment would, however, likely find its greatest application in externally exposed hot structure such as a gas turbine engine exhaust nozzle.

The approach of the invention provides an important advance in the art of protection of structures from external heating, and in reducing the infrared signature of the structure. Other features and advantages of the invention will be apparent from the following more detailed description of the preferred embodiments, taken in conjunction with the accompanying drawings, which illustrate, by way of example, the principles of the invention.

DETAILED DESCRIPTION OF THE PREFERRED EMBODIMENTS

Figure 1:
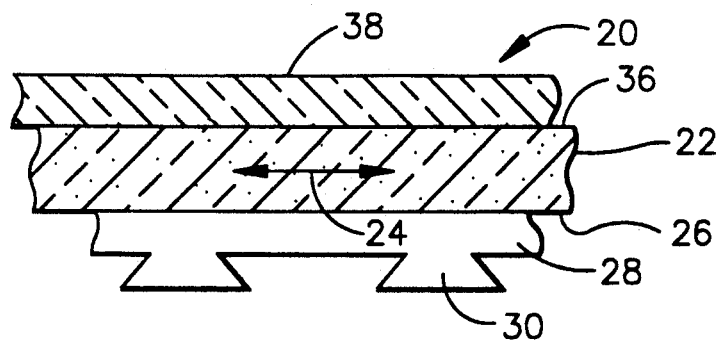
FIG. 1 is fragmentary side elevational view of a flat insulating panel according to the invention.
Figure 2:
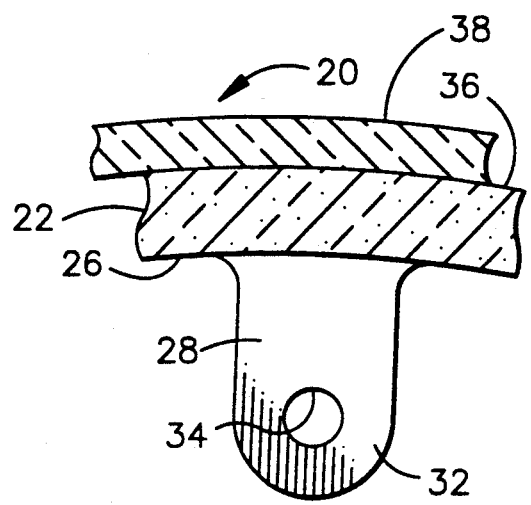
FIG. 2 is fragmentary side elevational view of a curved insulating panel according to the invention.

FIGS. 1 and 2 illustrate an insulating panel 20 that may be attached to a structure to protect it from overheating. The panel 20 includes a piece 22 of a compliant, porous material. As used herein, "compliant" means that the piece is deformable at elevated temperatures more easily than is a fully dense piece of the same material. The insulating panel 20 and piece 22 of compliant, porous material are illustrated in one embodiment in FIG. 1 as flat, and are illustrated in another embodiment in FIG. 2 as curved. The compliant, porous piece 22 is preferably made of a ceramic, such as aluminum oxide or silicon carbide, but may also be a metal such as a nickel-based superalloy.

The material of the compliant, porous piece 22 is preferably an open-cell foam structure, having an apparent density of less than about 25 percent. That is, the piece 22 desirably is of low apparent density, and has an open-cell structure so that gas can freely flow through the structure in a direction 24 parallel to the plane of the panel 20. A preferred material for the compliant, porous piece 22 is a silicon carbide foam available as DuoCel Foam from Energy Research and Generation, Inc., which has an apparent density of from about 10 to about 20 percent. The DuoCel Foam has a mesh roughly comparable to that of a scouring pad, with voids spaced at between 10 and 40 per inch and a web or fiber thickness of approximately 0.015 inch.

Bonded to a first side 26 of the compliant, porous piece 22 is a support base 28. The support base 28 is desirably made of a fully (or nearly fully) dense structural material. In the case of the preferred silicon carbide foam piece 22, the support base 28 is preferably a piece of substantially fully dense silicon carbide. The silicon carbide support base 28 is bonded to the foam piece 22 by placing an excess of silicon, preferably in powdered form, between the silicon carbide support base 28 and the foam piece 22, and then heating to a temperature greater than the melting point of the silicon. Interdiffusion occurs, and upon cooling the foam piece 22 is bonded to the support base 28. The silicon carbide support base 28 may be supplied, or may be prepared by infiltration of a carbon structure by silicon. These techniques are described more fully in the following U.S. Pat. Nos., whose disclosures are incorporated by reference: 4,626,516; 4,737,328; 4,120,731; 4,141,948; 4,148,894; 4,220,455; 4,238,433; 4,240,835; 4,242,106; 4,247,304; and 4,353,953.

The support base 28 includes means for attaching the support base 28 to a substrate structure. The means for attaching can be any operable approach, but is preferably a mechanical interlock of some type. FIG. 1 illustrates a dovetail 30 that can be engaged to conforming dovetail slots in the substrate structure (not shown). FIG. 2 illustrates a lug 32 that can be engaged to a conforming slot in the substrate structure (not shown) and attached with a pin (not shown) that fits through a pin bore 34 in the lug 32. These means for attaching are illustrative, and are not limiting of the approaches that may be used.

Bonded to a second (opposite to the first) side 36 of the piece 22 of compliant, porous material is a skin 38. The skin 38 is made of a thermally resistant material, most preferably a ceramic. The skin 38 may be made of the same material conventionally used in thermal barrier coatings, such as a yttrium oxide-zirconium oxide ceramic.

The skin 38 is preferably applied to the second side 36 of the piece 22 by a spraying process, such as plasma spraying. Deposition of thermal barrier coatings, such as yttrium oxide-zirconium oxide coatings, is well known in the art. In the present approach, the skin 38 is preferably deposited onto the compliant, porous piece 22 by air plasma spraying, producing a characteristic, well known plasma-sprayed structure. See, for example, the following U.S. Pat. Nos., whose disclosures are incorporated by reference: 4,321,310; 4,401,697; 4,405,659; 4,405,660; and 4,414,249. The initially deposited region of the plasma sprayed ceramic penetrates a short distance into the porous piece 22 before it solidifies, producing a strongly interlocked bonding between the skin 38 and the porous piece 22.

That the piece 22 is porous is a major advantage in maintaining good bonding between the skin 38 and the piece 22 during service. The piece 22 is compliant, so that its second side 36 expands and contracts to match that of the skin 38. This matching of thermal expansion avoids the buildup of thermal stresses in the skin 38, reducing the likelihood that it will fracture and spall away from the protected surface during thermal cycling in service. Any mismatch strains between the skin 38 and the compliant piece 22 are accommodated by harmless internal deformation of the piece 22.

In a typical insulating panel 20, the compliant, porous piece 22 is about 0.050 inches thick. The skin 38 is about 0.030 inches thick. The support base 28 is as thick as necessary to provide the desired attachment, but is typically about 0.050 inches thick. These dimensions are intended to be illustrative, but are not limiting of the invention.

Figure 3:
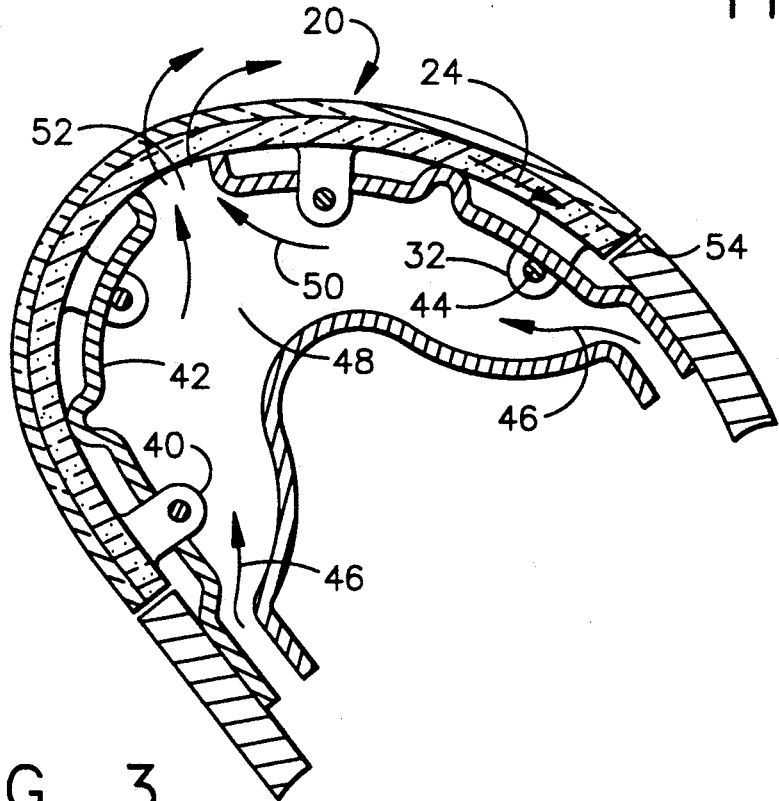
FIG. 3 is a fragmentary side elevational view of several curved insulating panels attached to a gas turbine vane substrate, with provision for cooling air to pass through the compliant porous material.

FIG. 3 illustrates the attachment of the panel 20 to a piece of underlying substrate structure 40. In this case, the substrate structure 40 is the leading edge of a turbine vane in a gas turbine engine, which experiences very high heat loading because hot exhaust gases direct from the combustor impinge upon this leading edge. One or more curved panels 20 of the type illustrated in FIG. 2 are attached to the substrate structure 40, which is made of any type of high-temperature nickel-based or cobalt-based superalloy. The lugs 32 of the panels 20 slip through slots (not shown) in a mounting structure 42, and are held in place with pins 44. If a panel should become damaged during service, it can be removed by removing the pin 44, replacing the panel, and re-inserting the pin.

The panel 20 insulates the substrate structure 40 from the high temperatures of the combustion gases that impinge upon the leading edge of the substrate structure 40. The insulation effect arises from the presence of the ceramic material of the skin 38, the porous material of the compliant, porous piece 22 (which inherently has a low thermal conductivity due to the air-containing voids in the piece 22), and the support base 28.

Additional relief from the high external temperatures can be achieved by channelling a flow of air through the porous piece 22. In the structure of the vane of FIG. 3, an inflow 46 of cooling bleed air from the compressor stage of the gas turbine is passed, via vane end bands into a plenum 48 within the substrate structure 40 of the gas turbine vane. An outflow 50 of cooling air from the plenum 48 passes through an opening 52 provided in the mounting structure 42, and into the porous piece 22. The air cannot escape outwardly from the porous piece 22 through the skin 38, or inwardly from the porous piece 22 through the support base 28 and the mounting structure 42. The cooling air therefore follows the in-plane direction 24 parallel to, but below, the skin 38 toward surface openings 54. The cooling air is heated by heat diffused through the skin 38 as it flows parallel to the skin 38, and this heat is removed so that it cannot damage the substrate structure 40. The heated air that leaves the surface openings 54 cools the downstream external surface of the skin 38 by film cooling, a well known phenomenon. The likelihood of thermally induced damage of the skin 38 and the turbine vane is thereby reduced. Thus, the sub-surface cooling technique made possible With the present structure can be used by itself or in conjunction with film cooling, to reduce the temperature and likelihood of damage of the protected component.

In a prior approach, described in U.S. Pat. No. 4,629,397, an air permeable metal felt was deposited onto a substrate having surface cooling channels, and then an air impermeable ceramic layer was deposited over the felt. This approach relies on metallurgical bonding of the felt layer to the underlying substrate, which may be difficult to attain in high-temperature applications. The '397 patent teaches that the felt is metal, which can be soldered, brazed, welded, or adhesively bonded to the substrate. This type of bonding would not be operable to bond the ceramic porous materials required for advanced aircraft applications to a metal substrate structure.

The approach of the '397 patent also has the shortcoming that the overlying protective layer cannot be replaced easily if damage such as thermally induced cracks begin to appear. Instead, the entire protective layer must be removed and replaced, or, alternatively, the damaged part discarded. The approach of the '397 patent teaches that air cannot be channelled through the felt layer to flow parallel to the surface. Thus, this additional cooling capability is not available with the approach of the '397 patent. The present invention overcomes these various shortcomings of the approach of the '397 patent.

Figure 4:
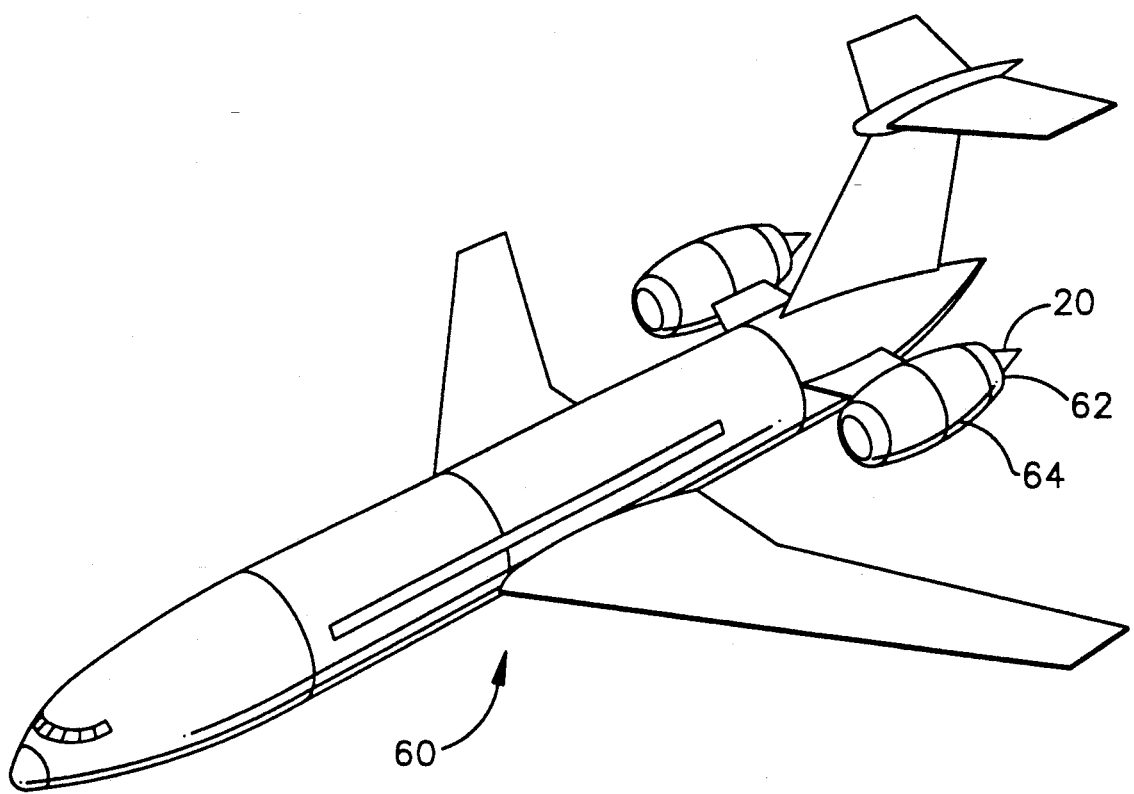
FIG. 4 is a perspective view of an aircraft with engine nozzles protected by the insulating panels of the invention.

Another application of the present approach is illustrated in FIG. 4. An aircraft 60 has externally exposed surfaces that are visible to persons external to the aircraft and must be operated at a high temperature. (The turbine vanes discussed in relation to FIG. 3 are not externally visible.) An example of such an exposed surface is a nozzle 62 of an aircraft gas turbine engine 64. The hot combustion gases leave the engine 64 through the nozzle 62, heating the nozzle 62 to a temperature greater than that of the surrounding air. The nozzle 62 therefore produces a strong infrared signature to the rear and sides of the aircraft 60.

According to the present invention, the externally exposed and heated surfaces of the aircraft 60, such as the nozzle 62, are protected with insulating panels 20 of the type discussed in relation to FIGS. 1 and 2. The insulating panels 20 reduce the external aircraft surface temperature caused by the exhaust gas in the manner described previously in relation to the structure of FIG. 3.

Additionally, the insulating panels 20 reduce the infrared signature of the protected structure. With cooling air directed through the porous piece 22, the surface temperature of the skin 38 is less than it would otherwise be, reducing its infrared emissions. The present sub-surface cooling technique may be combined with the use of film cooling in the manner previously described, to further reduce the surface temperature of the skin 38. The outer surface of the skin 38 may also be coated with known materials for reducing infrared emissions. The porous piece 22 also may act to disturb radar and radio waves that impinge upon the aircraft 60, thus possibly reducing the radar or radio signature of the aircraft. The outer surface of the skin 38 may also be coated with known materials for reducing radar and radio reflections. This approach to providing thermal protection and possibly reducing radiation sigantures is light in weight because of the low apparent density of the porous piece 22. However, the porous piece 22 does add some additional thickness to the nozzle.

The present invention provides an important advance for protection of structures against external heating, and additionally to reducing the infrared signatures of externally visible structures. Although the present invention has been described in connection with specific examples and embodiments, it will be understood by those skilled in the arts involved, that the present invention is capable of modification without departing from its spirit and scope as represented by the appended claims.

What is claimed is:

1. An insulative panel that is attachable to a structure to protect the structure, comprising:
   a piece of a compliant, porous material;
   a support base bonded to a first side of the piece of porous material, the support base including means for attaching the support base to a structure;
   a skin made of a thermally resistant material bonded to a second side of the piece of porous material; and
   means for directing a flow of air through the piece of porous material.

2. An attachable thermal barrier structure, comprising:
   a piece of compliant, porous ceramic foam;
   a support base made of a nonporous ceramic material bonded to a first side of the piece of ceramic foam, the support base including means for attaching the support base to an underlying structure;
   a skin made of a nonporous ceramic material bonded to a second side of the piece of porous ceramic foam; and
   means for directing a flow of air through the piece of porous ceramic foam.

3. An aircraft structure protected against external heating and having a reduced radiation signature, comprising:
   an externally exposed piece of the structure; and
   an insulative panel that is attachable to the structure to protect said structure, said panel comprised of
   a piece of compliant, porous material,
   a support base bonded to a first side of the piece of porous material, the support base including means for attaching the support base to the structure, a skin made of a thermally resistant material bonded to a second side of the piece of porous material, and means for directing a flow of air through the piece of porous material in a direction generally parallel to the skin.

4. The aircraft structure of claim 3, wherein the externally exposed piece of the structure is an exhaust nozzle of a gas turbine engine.

* * * * *